United States Patent [19]

Schwegler et al.

[11] Patent Number: 5,794,597
[45] Date of Patent: *Aug. 18, 1998

[54] DEVICE FOR SUPPLYING INTERNAL COMBUSTION ENGINE WITH FUEL FROM SUPPLY CONTAINER

[75] Inventors: Helmut Schwegler, Pleidelsheim; Kurt Frank, Schorndorf; Ansgar Seitz, Neuhausen; Wolfgang Bueser, Freiberg; Uwe Talmon, Muehlacker, all of Germany

[73] Assignee: Robert Bosch GmbH, Stuttgart, Germany

[*] Notice: The term of this patent shall not extend beyond the expiration date of Pat. No. 5,469,829.

[21] Appl. No.: 732,488

[22] PCT Filed: Feb. 23, 1996

[86] PCT No.: PCT/DE96/00284

§ 371 Date: Oct. 28, 1996

§ 102(e) Date: Oct. 28, 1996

[87] PCT Pub. No.: WO96/35871

PCT Pub. Date: Nov. 14, 1996

[30] Foreign Application Priority Data

Mar. 9, 1995 [DE] Germany .............. 195 16 890.9

[51] Int. Cl.$^6$ ................................................ F02M 37/04
[52] U.S. Cl. ................................ 123/514; 123/463
[58] Field of Search ................... 123/509, 510, 123/514, 463, 497

[56] References Cited

U.S. PATENT DOCUMENTS

| | | | |
|---|---|---|---|
| 4,664,142 | 5/1987 | Bertsch | 123/510 |
| 5,088,463 | 2/1992 | Affeldt | 123/514 |
| 5,140,963 | 8/1992 | Brackett | 123/470 |
| 5,361,742 | 11/1994 | Briggs | 123/514 |
| 5,425,342 | 6/1995 | Ariga | 123/514 |
| 5,435,344 | 7/1995 | Robinson | 123/514 |
| 5,435,345 | 7/1995 | Robinson | 123/514 |
| 5,469,829 | 11/1995 | Kleppner | 123/510 |
| 5,537,980 | 7/1996 | Yamamoto | 123/514 |

*Primary Examiner*—Carl S. Miller
*Attorney, Agent, or Firm*—Michael J. Striker

[57] ABSTRACT

The device has a feed pump arranged in the supply tank (12), which can be inserted through an opening (20) in the supply tank (12). The opening (20) is closed by means of a closure element (22) on which a pressure regulator is disposed, which is connected with the pressure side of the feed pump and with the internal combustion engine, and which can be connected with a relief chamber (12). The closure element (22) has a base body (30) made of plastic, in which a depression (40) has been formed, which is closed by means of an elastic diaphragm (52), so that a pressure chamber is formed. A connector (45) projects into the depression (40), which is connected with the relief chamber (12) and whose front end (51) can be closed by means of a flattened ball (74), which is movably seated in a support element (70) connected with the diaphragm (52). The diaphragm (52) is clamped between a retaining element (54) and the base body (30), and the ball (74) is pressed with its flattened area (75) against the front end (51) of the connector (45) by means of a pre-stressed spring (60) acting on the diaphragm (52). When a defined pressure is exceeded in the pressure chamber, the diaphragm (52) is lifted and the ball (74) clears the connector (45) and fuel can flow out of the pressure chamber.

11 Claims, 4 Drawing Sheets

5,794,597

1

DEVICE FOR SUPPLYING INTERNAL COMBUSTION ENGINE WITH FUEL FROM SUPPLY CONTAINER

PRIOR ART

The invention relates to a device for supplying an internal combustion engine with fuel from a supply tank in accordance with the species of claim 1.

Such a device is known from DE 44 02 224 A1. This device has a feed pump disposed in the supply tank, which can be inserted through an opening in the supply tank. The opening in the supply tank can be closed by means of a closure element, on which a pressure regulator is arranged. The pressure regulator has a pressure chamber, which has a connection with the pressure side of the feed pump, with the internal combustion engine and with a relief line. In this case the closure element has a flange-like base body made of plastic, which closes the opening. A depression has been made in the base body, into which a connector projects, which is made of one piece with the base body and which constitutes the connection of the pressure chamber with the relief chamber. To form a pressure chamber, the depression in the base body is covered with an elastically deformable diaphragm, which directly acts together with the front end of the connector as a seat. The diaphragm is acted upon by a spring in the direction toward the connector, and when a defined pressure is exceeded, the diaphragm clears the connector for a connection between the pressure chamber and the relief chamber. The diaphragm is stretched between the base body and a separate retaining element fastened on the base body. It was noted that during opening and closing the connector, the diaphragm does not move exactly perpendicularly in respect to it, but instead rubs against it and thus is subject to wear, so that the diaphragm only has a limited durability and the function of the pressure regulator is not permanently assured.

ADVANTAGES OF THE INVENTION

In contrast to this, the device in accordance with the invention for supplying an internal combustion engine with fuel from a fuel tank, having the characteristics of claim 1, has the advantage that the diaphragm is not subject to wear, so that the pressure regulator has sufficient durability.

Advantageous embodiments and further developments of the invention are recited in the dependent claims. The manufacture and mounting of the closure element is further simplified by means of the one-piece design of the connectors in accordance with claim 5. A secure seating of the diaphragm and a simple mounting of all elements of the pressure regulator in one direction is made possible by the embodiment in accordance with claim 8.

DRAWINGS

Several exemplary embodiments of the invention are represented in the drawings and will be explained in detail in the following description.

Shown in FIG. 1 is a device for supplying an internal combustion engine with fuel from a fuel tank, in FIG. 2, a closure element of the fuel tank in FIG. 1 in longitudinal section in an enlarged representation in accordance with a first embodiment, FIG. 3, a pressure regulator of the closure element in FIG. 2 in an enlarged representation, FIG. 4, a second exemplary embodiment of the closure element,

2

FIG. 5, a first variant of the fastening of a retaining element of the closure element in FIG. 4, FIG. 6, a second variant of the fastening of the retaining element in the view in accordance with the direction of the arrow VI in FIG. 4, FIG. 7, a third exemplary embodiment of the closure element, and FIG. 8, the supply tank of the device with an additional injector pump.

DESCRIPTION OF THE EXEMPLARY EMBODIMENTS

Figure 1:
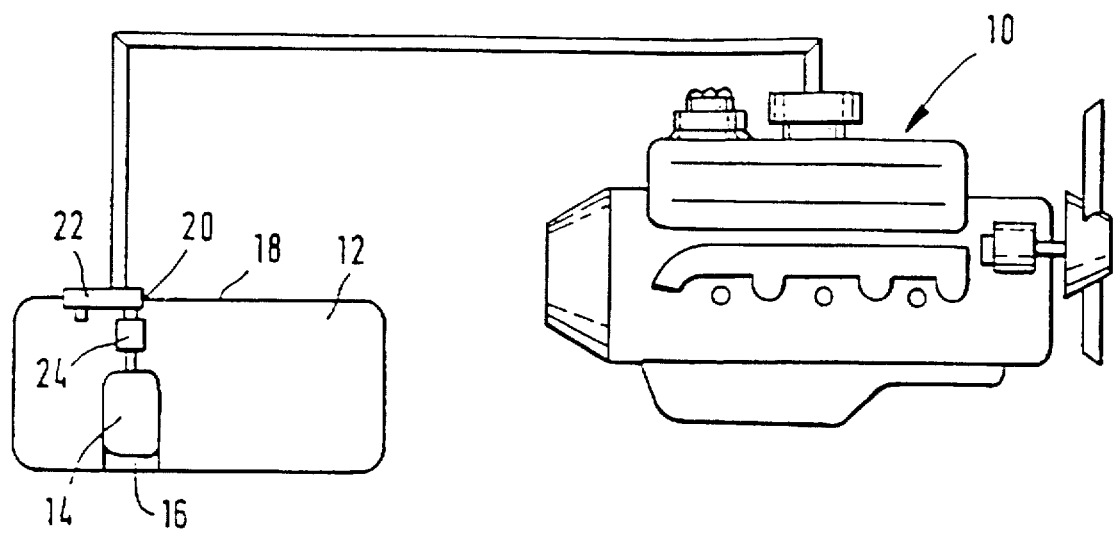

A device, represented in a simplified manner in FIG. 1, is used for supplying an internal combustion engine 10 with fuel from a supply tank 12. The device has a feed pump 14, which is disposed in the supply tank 12 and is held there in a manner not represented. The feed pump 14 can be designed in any arbitrary form and on its aspirating side aspirates fuel from a reservoir 16 in the supply tank 12. The supply tank 12 has an opening 20 in a wall 18, through which the feed pump 14 can be inserted. After the introduction of the feed pump 14, the opening 20 can be closed by means of a closure element 22, wherein a line for connection of the pressure side of the feed pump 14 with the internal combustion engine 10 is conducted through the closure element 22. A fuel filter 24 can be disposed in the connection between the pressure side of the feed pump 14 with the closure element 22.

Figure 2:
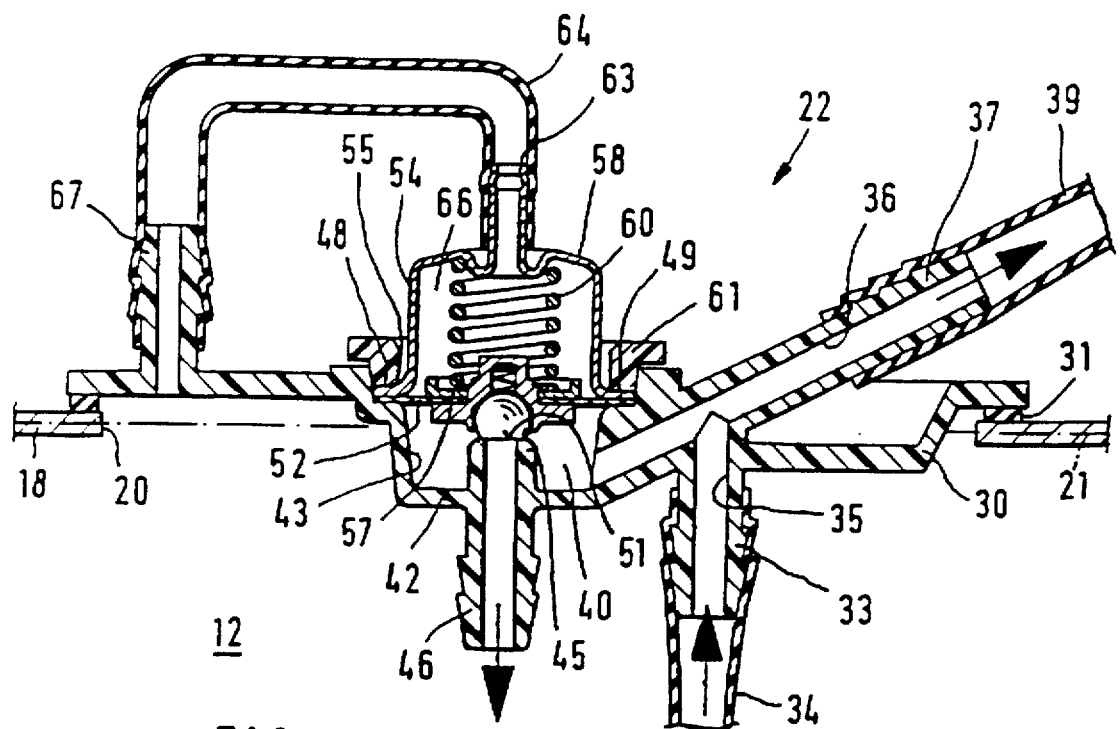

A first exemplary embodiment of the closure element 22 is represented in FIG. 2. In this case the closure element 22 has a flange-like base body 30, which has been produced from plastic by injection molding, which covers the opening 20 in the supply tank 12. A sealing element 31 can be disposed between the outer edge of the closure element 22 and the wall 18 of the supply tank 12. The closure element 22 is fastened on the supply tank 12 in a manner not shown. Position definitions will be supplied in what follows, wherein an inward disposition means toward the interior of the supply tank 12, and an outward disposition means facing away from the supply tank 12 toward the outside. An inward facing connector 33 is formed in one piece with the base body 30, to which a line 34 for a connection with the pressure side of the feed pump 14 can be connected. In addition, a further connector 37 projects outward from the base body 30, to which a line 39 for a connection with the internal combustion engine 10 can be attached. The connectors 33 and 37 are connected with each other by means of channels 35 and 36 formed in the base body 30, wherein the conduit 35 of the connector 33 extends approximately perpendicular in respect to the plane 21 in which the opening 20 is disposed, and the conduit 36 of the connector 37 extends inclined away from this plane 21. The conduit 36 terminates in a depression 40, formed approximately centered in the base body 30, which is bounded toward the interior by a bottom 42 of the base body 30 and laterally by a circumferential edge 43, and is open toward the outside. The conduit 36 terminates in the depression 40 at the edge 43 above the bottom 42. In cross section parallel with the plane 21, in which the opening 20 extends, the depression can be embodied to be round or angular. A connector 45 projects approximately centered from the bottom 42 of the base body 30 into the depression 40, i.e. toward the outside on the base body, and a connector 46 projects coaxially with it from the bottom 42 toward the inside, and a line can be connected with it.

Figure 3:
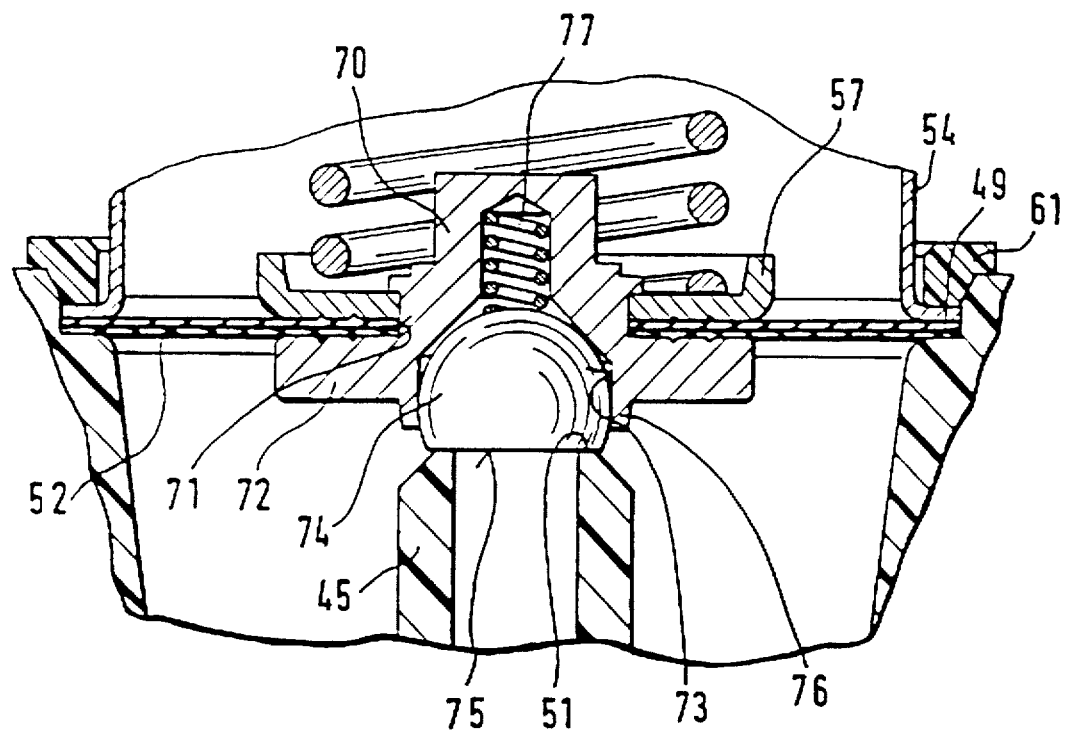

Joining the depression 40, a recess 48, which has a larger cross section than the depression 40, is formed in the base body 30 toward the outside. A circumferential flat collar 49 facing toward the exterior is formed at the transition between the depression 40 and the recess 48. The front end 51 of the connector 45 projecting into the depression 40 is disposed at approximately the same height as the collar 49 and is essentially embodied flat. An elastically deformable diaphragm 52 has been placed from the outside into the recess 48 and rests with its outer edge on the collar 49. As represented in FIG. 3, a support element 70 is disposed in the central area of the diaphragm 52, which has a pin-like section passing upward through an opening 71 in the diaphragm 52 away from the connector 45, and on the underside of the diaphragm 52 has a plate-like section 72 in the direction toward the connector 45. A bore 73 is provided centrally from the bottom in the section 72, into which a ball 74 has been inserted with slight play. The ball 74 is disposed with only a portion of its circumference in the bore 73 and has a flattened area 75 on its area projecting out of the bore 73, which is formed over less than half the circumference of the ball 74. A collar-like edge 76 projects downward from the support element 70 toward the connector 45, which encloses the bore 73 approximately coaxially. The edge 76 is inwardly crimped over the largest diameter of the ball 74, so that the ball 74 is held freely movable in the bore 73. A pre-stressed compression spring 77 is clamped between the upward facing bottom of the bore 73 and the ball 74, by means of which the ball 74 is pushed downward against the inwardly crimped edge 76. With its flattened area 75, the ball 74 acts together with the front end 51 of the connector 45 as a valve element. Together with the support element 70 and the ball 74 disposed in it, the diaphragm 52 constitutes a diaphragm component.

A cup-shaped retaining element 54 is disposed in the recess 48 above the diaphragm 52, which is inserted with its open front end into the recess 48 and has a flange 55 there, and the outer edge of the diaphragm 52 is sealingly clamped between it and the collar 49. A spring plate 57 rests on the center area of the side of the diaphragm 52 facing the outside, and a compression spring 60 is clamped between it and the bottom 58 of the retaining element 54. The retaining element 54 can be embodied as a sheet metal element, for example. A ring 61 made of plastic is pushed as a fastening element over the retaining element 54, which is inserted into the recess 48, acts on the outward facing side of the flange 55 and is fastened on the base body 30. The retaining element 54 is fixed on the base body 30 by means of the ring 61. For fastening, the ring 61 can be welded to the base body 30, for example, preferably by means of ultrasound or friction welding, or glued or fastened in another way. A connector 63 projects outward from the bottom 58 of the retaining element 54, on which an end of a line 64, for example a hose, can be pushed, by means of which the chamber 66 bounded by the retaining element 54 and the diaphragm 52, in which the compression spring 60 is disposed, can be connected with the atmosphere. The base body 30 has further outward projecting connector 67, which is open toward the inside and on which the other end of the line 64 is pushed. The chamber 66 is connected in this way with the interior of the supply tank 12, in which atmospheric pressure prevails, and it is assured that no foreign bodies can enter the chamber 66, such as dirt or water. In addition, it is assured by this that fuel vapor possibly diffused through the diaphragm 52 into the chamber 66 cannot exit to the outside and instead is returned into the supply tank 12.

Together with the diaphragm 52, the depression 40 forms a sealed pressure chamber, which is connected via the conduit 36 with the pressure side of the feed pump 14 and with the internal combustion engine 10. The pressure chamber can furthermore be connected via the connector 45 with a relief chamber, which in this exemplary embodiment is the supply tank 12 which terminates in the connector 46. The ball 74 is pressed with its flattened area 75 on the front end 51 of the connector 45 by the pre-stress of the compression spring 60 and closes it as long as the pressure prevailing in the pressure chamber exerts a lighter force on the diaphragm 52 than the compression spring 60. If the pressure in the pressure chamber exceeds a defined value determined by the pre-stress of the compression spring 60, the diaphragm 52 and the ball 74 with it are lifted off the front end 51 and and clear the connector 45, so that fuel can flow from pressure chamber back into the supply tank 12 serving as a relief chamber. In the process, the diaphragm 52 is not moved in an exactly straight line which, however, is compensated by the ball 74 which is freely movable in the bore 73 and always rests on the front end 51 of the connector 45 with its flattened area 75. As long as the diaphragm is pushed upward on one side by only a short distance, the ball 74 remains seated with its flattened area 75 on the front end 51 of the connector 45, wherein the one-sided lifting of the diaphragm 52 is compensated by a pivot movement of the ball 74 in the bore 73.

The above described arrangement constitutes a pressure regulator disposed on the closure element 22, wherein the diaphragm 52 with the ball 74 is used as a closure member, which works together with the front end 51 of the connector 45 as the seat. In this case the construction of the closure element 22 and of the pressure regulator is very simple and the mounting of the components constituting the pressure regulator is possible in a direction from the outside. The device only needs to have one line for connection with the internal combustion engine 10, a return line is not required, since excess fuel can already flow off in the pressure regulator into the relief chamber.

Figure 4:
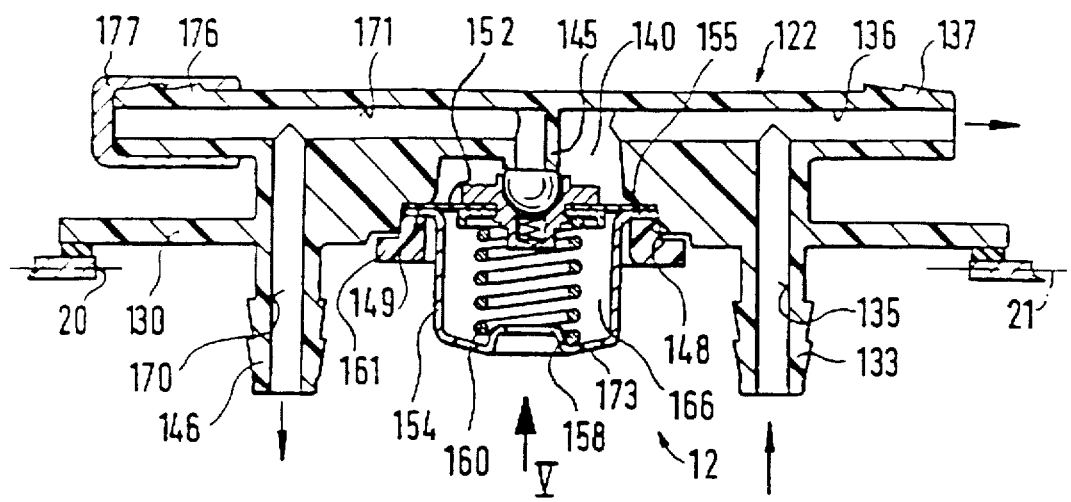

A second exemplary embodiment of the closure element 122 is represented in FIG. 4, wherein elements which are the same or similar to those in the first exemplary embodiment are provided with reference numerals increased by 100. The closure element 122 has the base body 130, made of plastic by injection molding, which closes the opening 20. The connector 133 projects inward from the base body 130 for the connection with the pressure side of the feed pump 14, and the connector 137 projects outward for the connection with the internal combustion engine 10. The two connectors 133 and 137 are connected with each other by the conduits 135 and 136 formed in the base body 130. The conduit 135 of the connector 133 extends approximately perpendicular in respect to the plane 21 in which the opening 20 is disposed, and the conduit 136 of the connector 137 extends approximately parallel in respect to this plane 21 outside of the supply tank 12. Furthermore, a connector 146 projects inward from the base body 130, which is connected with the connector 145 projecting inward into the depression 140 via a conduit 170, extending approximately perpendicular in respect to the plane 21 in which the opening 20 is disposed, and via a further conduit 171 extending approximately parallel in respect to this plane. The depression 140 is arranged in a way opposite to the first exemplary embodiment, so that it is open toward the interior, i.e. to the supply tank 12. As in the first exemplary embodiment, the recess 148 is embodied toward the inside on the base body 130 following the depression 140. The diaphragm 152 is placed with its outer edge on the inward facing collar 149 and fixed in place by means of the retaining element 154 which, in turn, is fastened on the base body 130 by means of the ring 161. As in the first exemplary embodiment, the retaining element 154 is embodied cup-shaped and arranged with its flange 155 in the recess 148, and the outer edge of the diaphragm 152 is clamped between it and the collar 149. The pre-stressed compression spring 160 is disposed between the bottom 158 of the retaining element 154 and the center area of the diaphragm 152. At least one opening 173 is formed in the bottom 158, through which the chamber 166 defined in the retaining element 154 is connected with the interior of the supply tank 12. No separate line for connecting the chamber 166 with the supply tank 12 is required with this embodiment. The conduit 136 can terminate in a connector 176 disposed outside of the supply tank 12, which can be closed by means of a cover 177, so that the run-off of the fuel from the pressure chamber into the supply tank 12 takes place via the connector 146, or a line can be pushed on the connector 176, so that the fuel flowing out of the pressure chamber can be used for other purposes, wherein the connector 146 is then closed by means of a cover. As with the first exemplary embodiment, the diaphragm 152 has the diaphragm component with the support element 70 and the ball 74 movably received in it, but wherein the support element 70 is arranged in such a way that its plate-like section 72 is disposed facing upward toward the connector 145.

Figure 5:
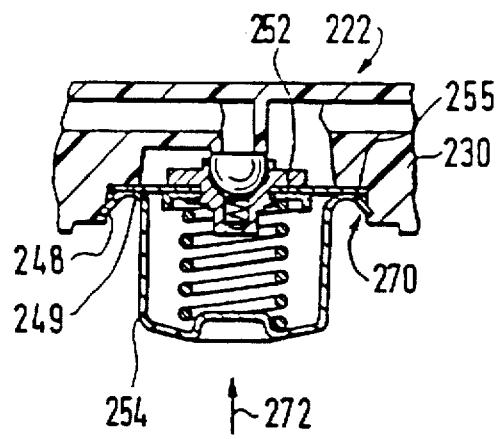

A variant of the closure element 222 with a modified fastening of the retaining element 254 is represented in FIG. 5, wherein the retaining element 254 is fastened directly on the base body 230 in the recess 248, and the ring 61 or 161 is not necessary. The base body 230 is essentially embodied the same as described in connection with the second exemplary embodiment. The retaining element 254 is also essentially embodied as a sheet metal element, as described above in connection with the first or second exemplary embodiment, and has a flange 255, and the outer edge of the diaphragm 252 is clamped between it and the collar 249. At least one hook 270 extends out of the area of the retaining element 254 arranged in the recess 248, which laterally projects beyond the recess 248 in the non-installed state of the retaining element 254 and which is resiliently pivotable in accordance with the arrow 272 transversely to the insertion direction of the retaining element 254 toward the interior, i.e. in the direction toward the retaining element 254. The free end of the hook 270 points outward, i.e. opposite to the insertion direction 272. In the course of inserting the retaining element 254 into the recess 248, the hook 270 is resiliently pivoted inward and enters the recess 248. The retaining element 254 is pushed into the recess 248, so that the diaphragm 252 is clamped. In the process the end of the hook 270 digs into the edge of the recess 248, because of which the retaining element 254 is fixed in place. In the event of a force acting on the retaining element 254 opposite to the insertion direction 272, the end of the hook 270 digs into the recess 248 like a barb. Since the retaining element 254 is made of sheet metal and the base body 230 of plastic, the end of the hook 270 can enter the edge of the recess 254 while plastically deforming the base body 230. Several hooks 270 are preferably provided, distributed over the circumference of the retaining element 254. The diaphragm component is unchanged from the embodiment in accordance with FIG. 4.

Figure 6:
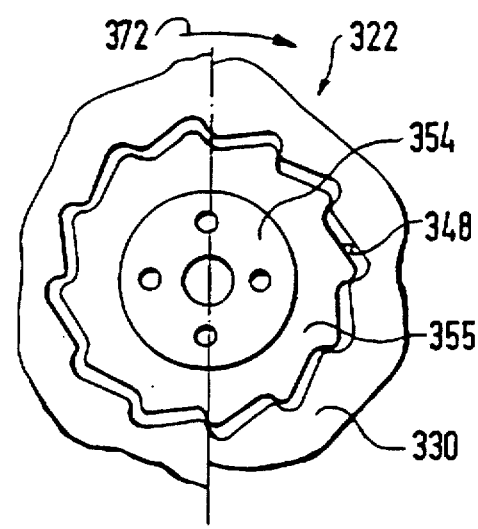

A second variant of the closure element 322 with a further modified fastening of the retaining element 354 is represented in FIG. 6, wherein the retaining element 354 is also fastened directly on the base body 330 which is essentially designed as described in connection with the second exemplary embodiment. As described in the first and second exemplary embodiments, the retaining element 354 is embodied as a sheet metal element and therefore has the flange 355 arranged in the recess 348, and the outer edge of the diaphragm is clamped between it and the collar. The outer edge of the flange 355 and the recess 348 are essentially circularly designed. The outer edge of the flange 355 is formed in a sawtooth-like manner along its circumference, and the inner edge of the recess 348 is provided over its circumference with a corresponding sawtooth-like counter profile. The retaining element 354 can be inserted in a rotated position, represented in FIG. 5 in the left half, into the recess 348, in which the sawteeth of its flange 355 meet the corresponding spaces on the inner edge of the recess 348. The retaining element 354 is pushed into the recess 348 so that the diaphragm 352 is securely clamped and is simultaneously turned in the direction of the arrow 372, so that the sawteeth of its flange 355 meet the sawteeth of the inner edge of the recess 348, as represented in the right half of FIG. 5. In the process the sawteeth of the flange 355 enter into the inner edge of the recess 348, while the base body 330 is plastically deformed, because of which the retaining element 354 is fastened on the base body 330.

Figure 7:
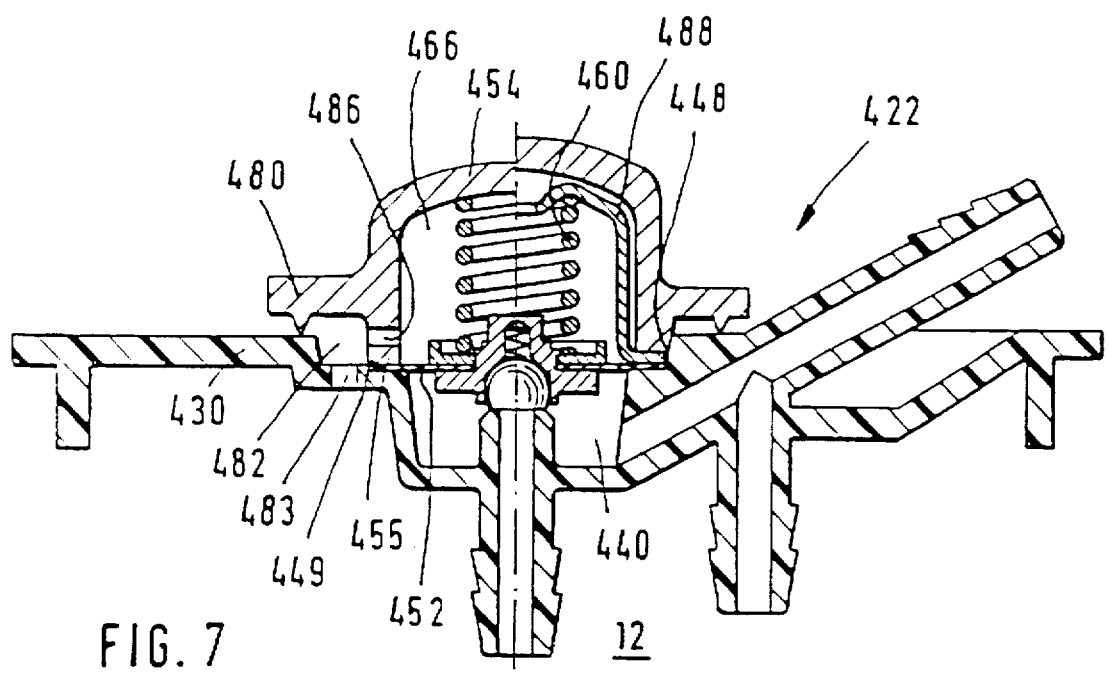

A variant of the closure element 422 with a modified retaining element is represented in the left half of FIG. 7. In this case the base body 430 of the closure element 422 and the retaining element are essentially designed the same as described in the first exemplary embodiment in FIG. 2. The retaining element 454 is made of plastic, is embodied cup-shaped and its open front end faces the base body 430. The retaining element 454 has the flange 455, by means of which it is disposed in the recess 448, and the outer edge of the diaphragm 452 is clamped between it and the collar 449. In addition, the retaining element 454 has a collar 480, extending laterally circumferentially past the recess 448, and the recess 448 has a bulge 482 on at least one place of its circumference, which is connected by means of an opening 483 in the base body 430 with the interior of the supply tank 12. An opening 486 is provided in the retaining element 454, through which the space 466 of the retaining element 454, which is located opposite the depression 440 on the diaphragm 452 and in which the compression spring 460 is disposed, is connected with the bulge 482. A space is bounded by the bulge 482 and the collar 480 covering it as well as the flange 455 of the retaining element 454, through which the space 466 is connected with the atmosphere, i.e. with the interior of the supply tank 12. In the above described embodiment it is also possible, as represented in the right half of FIG. 6, to additionally arrange inside the retaining element 454 a support element 488 of sheet metal for the compression spring 460, which has a flange disposed on the recess 448, and the outer edge of the diaphragm 452 is clamped between it and the collar 449, wherein the retaining element 454 presses with its flange 455 on the flange of the support element 488 and holds it. If the support element is also embodied to be cup-shaped, it also has an opening for the connection of the space 466 formed inside the support element 488 with the bulge 482 of the recess 448.

Figure 8:
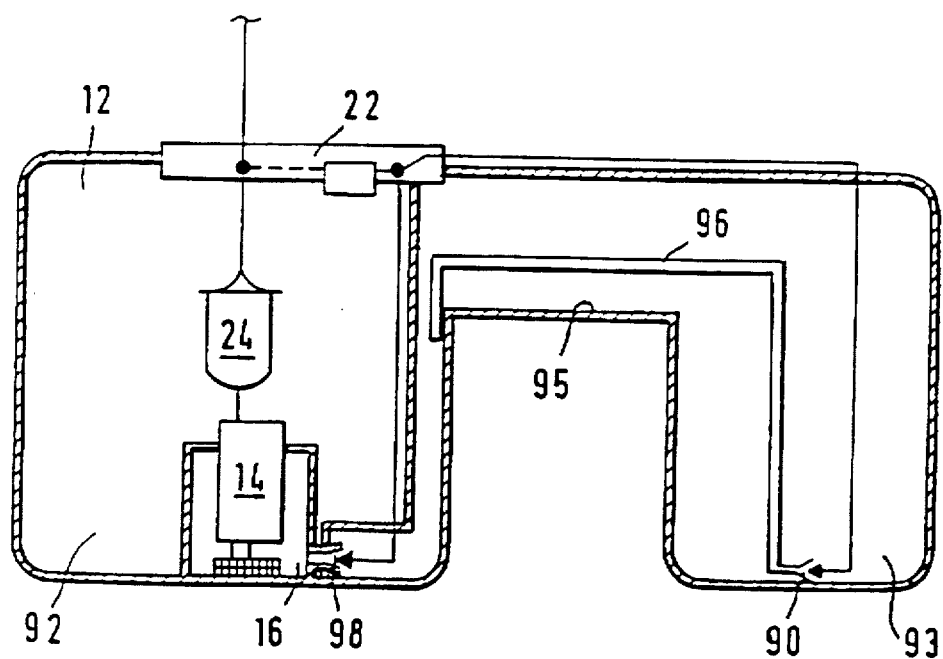

A modified embodiment of the entire device, which is basically embodied as described above, is represented in FIG. 8. The connector 46 or 146 of the base body, which connects the pressure chamber with a relief chamber, is here connected with at least one injector pump 90, which conveys fuel into the reservoir 16, from which the feed pump 14 aspirates it. This is particularly advantageous with supply tanks 12 with uneven bottoms, having several parts 92, 93 whose bottoms are separated from each other by raised humps or saddles 95, so that fuel cannot flow between these parts 92, 93. The injector pump 90 is disposed in a part 93, which is separate from the part 92 in which the feed pump is disposed, and conveys over the hump 95 through a line 96 into the part 92. In addition, an injector pump 98 can also be disposed in the part 92, by means of which fuel is conveyed into a pot used as reservoir 16 for the feed pump 14.

We claim:

1. A device for supplying with fuel 1 combustion engine with fuel from a supply tank, with a feed pump (14) disposed in the supply tank (12), which can be inserted through an opening (20) in the supply tank (12), with a closure element for closing the opening (20), on which a pressure regulator is disposed, which has a pressure chamber (40, 140, 440) with a connection to the pressure side of the feed pump (14), to the internal combustion engine (10) and to a relief chamber (12, 90, 98), wherein the closure element has a flange-like base body (30, 130, 230, 330, 430) made of plastic, which closes the opening (20), in which a depression (40, 140, 440) is formed, into which a connector (45, 145), which constitutes the connection of the pressure chamber with the relief chamber (12, 90, 98) and is made of one piece with the base body (30, 130, 230, 330, 430), projects, wherein the depression (40, 140, 440) for forming the pressure chamber is covered with an elastically deformable diaphragm (52, 152, 252, 452, which cooperates at least indirectly with the front end (51) of the connector (45, 145), wherein a spring (60, 160, 460) acts on the diaphragm (52, 152, 252, 452) in the direction toward the connector (45, 145) and, when a defined pressure is exceeded in the pressure chamber (40, 140, 440), clears the connector (45, 145) for the connection of the pressure chamber (40, 140, 440) with the relief chamber (12, 90, 98), and wherein the diaphragm (52, 152, 252, 452) is clamped between the base body (30, 130, 230, 330, 430) and a separate retaining element (54, 154, 254, 354, 454) fastened on the base body, characterized in that a support element (70) is connected with the diaphragm (52, 152, 252, 452) in which a flattened ball (74) is movably seated, wherein with its flattened area (75) the ball (74) cooperates as a closure member with the front end (51) of the connector (54).

2. The device in accordance with claim 1, characterized in that facing the connector (45), the support element (70) has a bore (73), into which the ball (74) has been placed with its spherical area, and that the edge (76) enclosing the bore (73) is crimped over the ball (74).

3. The device in accordance with claim 2, characterized in that the edge (76) enclosing the bore (73) projects from the support element (70) in the manner of a collar.

4. The device in accordance with claim 1, characterized in that a spring (77) is clamped in the support element (70), which acts on the ball (74) in the direction toward the connector (45).

5. The device in accordance with claim 1, characterized in that at least one connector (33, 37, 46, 133, 137, 146, 176) is formed in one piece on the base body (30, 130, 230, 330, 430), to which a line for a connection with the pressure side of the feed pump (14) and/or the internal combustion engine (10) and/or the relief chamber (12, 90, 98) can be attached.

6. The device in accordance with claim 1, characterized in that a closing spring (60, 160, 460) is clamped between the retaining element (54, 154, 254, 354, 454) and the diaphragm (52, 152, 252, 452), by means of which the ball (74) is pressed with its flattened area (75) against the front end (51) of the connector (45, 145).

7. The device in accordance with claim 1, characterized in that the retaining element (54, 154, 254, 354, 454) is embodied cup-shaped and has a flange (55, 155, 255, 355, 455) on its open front end facing the base body (30, 130, 230, 330, 430), and the edge of the diaphragm (52, 152, 252, 452) is clamped between it and the base body.

8. The device in accordance with claim 1, characterized in that, following the depression, the base body (30, 130, 230, 330, 430) has a recess (48, 148, 248, 348, 448) with a larger cross section than the depression (40, 140, 240, 340, 440), that at the transition between the depression and the recess a circumferential collar (49, 149, 249, 449) is formed, which faces away from the depression and against which the diaphragm (52, 152, 252, 452) rests with its edge, and that the retaining element (54, 154, 254, 354, 454) is inserted with its flange (55, 155, 255, 355, 455) into the recess.

9. The device in accordance with claim 8, characterized in that the retaining element (254) is embodied as a sheet metal element and that at least one hook (270), which is elastically pivotable transversely to the insertion direction (272) of the retaining element (254) projects from its area disposed in the recess (248), which digs into the edge of the recess (248) and in this way fixes the retaining element (254) in place on the base body (230).

10. The device in accordance with claim 8, characterized in that the retaining element (354) is embodied as a sheet metal element and its flange (355) is embodied sawtooth-like over its circumference, that the edge of the recess is formed with a corresponding sawtooth-like counter-profile, that in a rotated position the retaining element (354) can be inserted into the recess (348), and that by rotating the retaining element (348) its flange (355) engages the edge of the recess (348) transversely to the insertion direction of the retaining element while plastically deforming the base body (330) and in this way fixes the retaining element (354) on the base body (330).

11. The device in accordance with claim 8, characterized in that the chamber (466) of the diaphragm (452) located opposite the depression (440) is connected with a chamber (483) delimited between the retaining element (454) and the base body (430) which, in turn, is connected with the supply tank (12) via an opening (486) in the base body.

* * * * *